US012801543B2

(12) United States Patent
Tsunekawa

(10) Patent No.: US 12,801,543 B2
(45) Date of Patent: Nov. 17, 2026

(54) MEMORY EVALUATING BOARD AND MEMORY EVALUATING METHOD

(71) Applicant: Kioxia Corporation, Tokyo (JP)

(72) Inventor: Tetsuji Tsunekawa, Fujisawa (JP)

(73) Assignee: Kioxia Corporation, Tokyo (JP)

( * ) Notice: Subject to any disclaimer, the term of this patent is extended or adjusted under 35 U.S.C. 154(b) by 23 days.

(21) Appl. No.: 18/630,015

(22) Filed: Apr. 9, 2024

(65) Prior Publication Data

US 2024/0345973 A1 Oct. 17, 2024

(30) Foreign Application Priority Data

Apr. 11, 2023 (JP) ................................ 2023-064329

(51) Int. Cl.
*G06F 13/16* (2006.01)

(52) U.S. Cl.
CPC ................................ *G06F 13/1694* (2013.01)

(58) Field of Classification Search
CPC ......................... G06F 13/1694; G06F 13/1684
USPC .......................................................... 710/104
See application file for complete search history.

(56) References Cited

U.S. PATENT DOCUMENTS

2018/0246833 A1* 8/2018 Bai ........................ G06F 3/0665
2019/0034372 A1* 1/2019 Blevins ............... G06F 13/4291
2019/0272247 A1* 9/2019 Olarig ................. G06F 13/4068
2021/0144517 A1 5/2021 Guim Bernat et al.
2022/0027165 A1 1/2022 Juan et al.
2022/0050800 A1* 2/2022 Kim .................... G06F 13/4022
2022/0283960 A1* 9/2022 Long ................... G06F 13/4221
2023/0259281 A1* 8/2023 Yeh ....................... G06F 3/0655
711/154

* cited by examiner

*Primary Examiner* — Chun Kuan Lee
(74) *Attorney, Agent, or Firm* — Oblon, McClelland, Maier & Neustadt, L.L.P.

(57) ABSTRACT

In one embodiment, a memory evaluating board includes a first portion configured to mount a first memory including first and second lanes thereto, a second portion including an edge configured to connect to a slot of an apparatus that includes a first controller including first and second lanes and a second controller including first and second lanes, and a communication controller mounted to the first portion, and configured to control communication between the first memory and the apparatus. In case where the first memory is a single port, the communication is performed between the first and second lanes of the first memory and the first and second lanes of the first controller, respectively. In case where the first memory is a dual port, the communication is performed between the first and second lanes of the first memory and the first lanes of the first and second controllers, respectively.

18 Claims, 10 Drawing Sheets

| PCIE CARD SLOT | PCIE CONTROLLER | |
|---|---|---|
| | BIFURCATION DISABLED | BIFURCATION ENABLED |
| LANES L0 TO L7 | LINK 0 LANES L0 TO L7 | LINK 0 LANES L0 TO L7 |
| LANES L8 TO L15 | LINK 0 LANES L8 TO L15 | LINK 1 LANES L0 TO L7 |

FIG. 3

MEMORY EVALUATING BOARD AND MEMORY EVALUATING METHOD

CROSS REFERENCE TO RELATED APPLICATION

This application is based upon and claims the benefit of priority from the prior Japanese Patent Application No. 2023-064329, filed on Apr. 11, 2023, the entire contents of which are incorporated herein by reference.

FIELD

Embodiments described herein relate to a memory evaluating board and a memory evaluating method.

BACKGROUND

When an SSD (Solid State Drive) is evaluated, the SSD is connected to an SSD evaluating board, and the SSD evaluating board is connected to a motherboard in a PC (Personal Computer) to cause test software for evaluating the SSD to operate on the PC. This makes it possible to evaluate the SSD with the test software. The PC connected to the SSD evaluating board functions as an SSD evaluating apparatus by executing the test software.

Types of ports of the SSD include, for example, a x4 single port that causes four lanes of the SSD to operate as one x4 port, and a x2 dual port that causes four lanes of the SSD to operate as two x2 ports. In the x4 single port, the four lanes are caused to collectively operate. In the x2 dual port, two lanes configuring one link are caused to collectively operate, and the other two lanes configuring another link are caused to collectively operate, so that these links are caused to independently operate.

To evaluate the SSD of the dual port, it is necessary, for example, to connect the SSD to the SSD evaluating board having two PCIE (Peripheral Component Interconnect Express) card edges, and to connect the two PCIE card edges of the SSD evaluating board to two PCIE card slots of the motherboard. However, when the PCIE card edges are connected to the PCIE card slots with an extension cable, a communication quality between the SSD and the PC may degrade.

BRIEF DESCRIPTION OF THE DRAWINGS

FIG. 3 is a table representing a correspondence relationship between lanes of the evaluating system and PCIE bifurcation according to the first embodiment;

DETAILED DESCRIPTION

Figure 1:
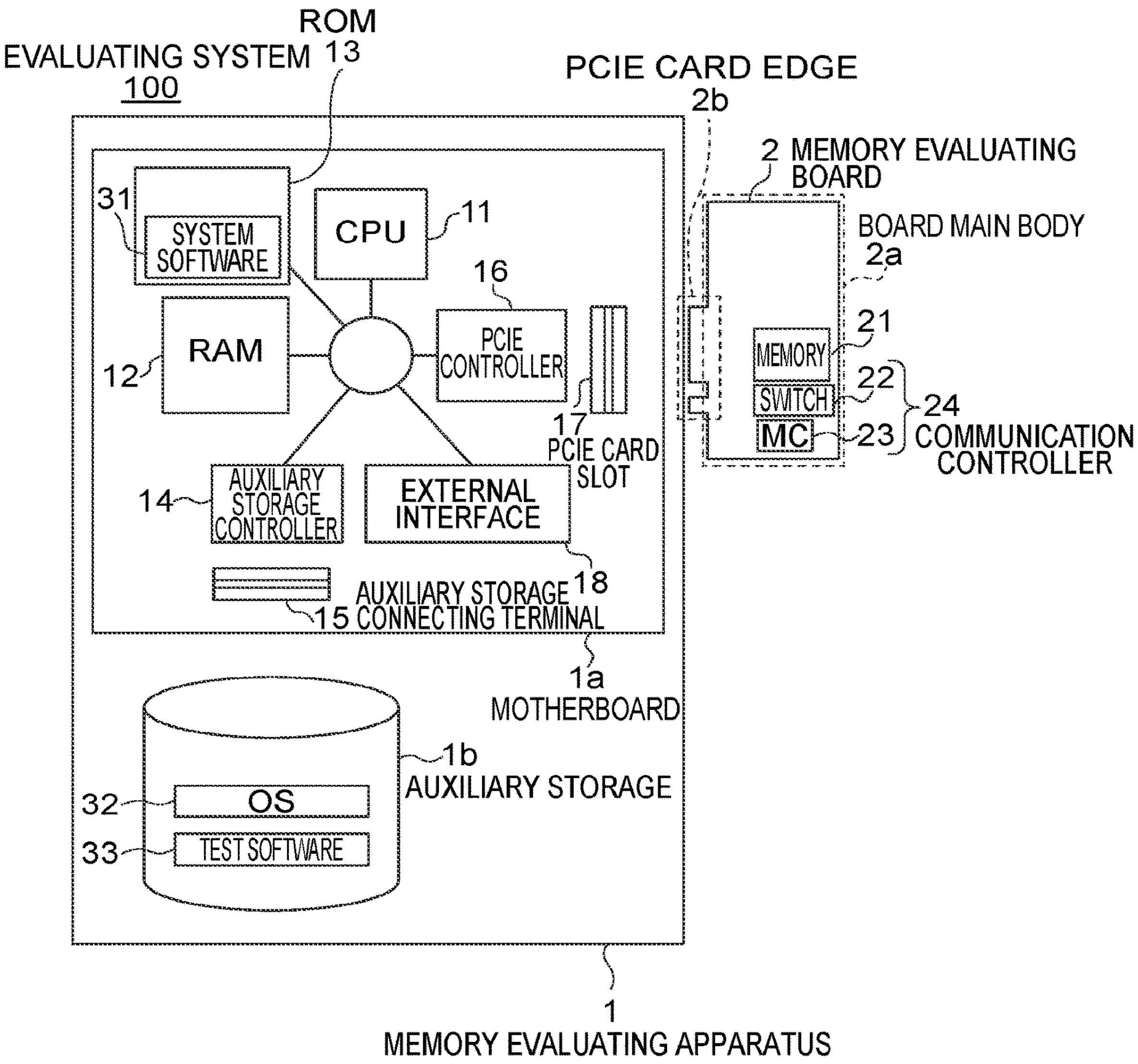
FIG. 1 is a block diagram illustrating a configuration of an evaluating system according to a first embodiment.

Embodiments will now be explained with reference to the accompanying drawings. In FIGS. 1 to 10, the same configurations are assigned with the same reference numerals.

In one embodiment, a memory evaluating board includes a first portion configured to mount a first memory including first and second lanes thereto, a second portion including an edge configured to connect to a slot of a memory evaluating apparatus that includes a first controller including first and second lanes and a second controller including first and second lanes, and a communication controller mounted to the first portion, and configured to control communication between the first memory and the memory evaluating apparatus. In a case where the first memory is a single port in a state where the edge is connected to the slot, the communication controller is configured to control the communication such that the communication is performed between the first lane of the first memory and the first lane of the first controller, and the communication is performed between the second lane of the first memory and the second lane of the first controller. In a case where the first memory is a dual port in the state where the edge is connected to the slot, the communication controller is configured to control the communication such that the communication is performed between the first lane of the first memory and the first lane of the first controller, and the communication is performed between the second lane of the first memory and the first lane of the second controller.

First Embodiment

FIG. 1 is a block diagram illustrating a configuration of an evaluating system 100 according to a first embodiment. The evaluating system 100 of the present embodiment includes a memory evaluating apparatus 1 and a memory evaluating board 2.

The memory evaluating apparatus 1 is an apparatus that evaluates a memory. The memory evaluating apparatus 1 is, for example, a PC. The memory evaluating apparatus 1 includes a motherboard 1*a* and an auxiliary storage 1*b*.

The motherboard 1*a* is a substrate on which various components are mounted.

The auxiliary storage 1*b* is a device functioning as an auxiliary storage of the memory evaluating apparatus 1. The auxiliary storage 1*b* is, for example, an HDD (Hard Disk Drive). The auxiliary storage 1*b* stores an OS (Operating System) 32 and test software 33. The OS 32 is a computer program. The OS 32 is basic software of the memory evaluating apparatus 1. The test software 33 is application software of the memory evaluating apparatus 1. The test software 33 is a computer program. The test software 33 is a program for evaluating a memory 21.

The motherboard 1*a* includes a CPU (Central Processing Unit) 11, a RAM (Random Access Memory) 12, a ROM (Read Only Memory) 13, an auxiliary storage controller 14, an auxiliary storage connecting terminal 15, a PCIE controller 16, a PCIE card slot 17, and an external interface 18.

The CPU 11 is a processor that performs various types of information processing. The CPU 11 controls various operations of the memory evaluating apparatus 1, for example.

The RAM 12 is a volatile memory functioning as a main storage of the memory evaluating apparatus 1.

The ROM 13 is a nonvolatile memory. The ROM 13 stores system software 31. The system software 31 is a computer program. The system software 31 is firmware that performs basic setting of the memory evaluating apparatus 1. The system software 31 is, for example, a BIOS (Basic Input/Output System). The system software 31 is an example of a system program.

The auxiliary storage controller 14 is a controller that controls the auxiliary storage 1*b*.

The auxiliary storage connecting terminal 15 is a connecting terminal for connection to the auxiliary storage 1*b*. The auxiliary storage connecting terminal 15 is connected to a connector of the auxiliary storage 1*b*, for example.

The PCIE controller 16 is a controller that controls a device in conformity to a PCIE standard (for example, the memory evaluating board 2).

The PCIE card slot 17 is a slot for connection to the device in conformity to the PCIE standard. For example, a PCIE card edge 2*b* of the memory evaluating board 2 is connected to the PCIE card slot 17.

The external interface 18 is an interface that performs communication between the motherboard 1*a* and another device (for example, the memory evaluating board 2). The external interface 18 is, for example, a USB (Universal Serial Bus) interface.

The memory evaluating board 2 is a substrate. The memory evaluating board 2 includes a board main body 2*a* and the PCIE card edge 2*b*.

The board main body 2*a* is a portion to which various components are mounted in the memory evaluating board 2. The board main body 2*a* has a structure to which the memory 21 can be mounted. The board main body 2*a* is an example of a first portion.

The PCIE card edge 2*b* is a portion for connection to the motherboard 1*a* in the memory evaluating board 2. The PCIE card edge 2*b* has a structure connectable to the PCIE card slot 17 of the motherboard 1*a*. The PCIE card edge 2*b* is an example of a second portion.

The board main body 2*a* includes the memory 21, a switch 22, and an MC (Micro Controller) 23. The switch 22 and the MC 23 configure a communication controller 24.

The memory 21 is a memory that is set as a target of an evaluation. The memory 21 is an example of a first memory. When the memory 21 is evaluated, the memory 21 is mounted to the memory evaluating board 2, and the memory evaluating board 2 is connected to the motherboard 1*a*.

The switch 22 is a device that switches lanes of the PCIE controller 16 to which lanes of the memory 21 are to be connected. The lanes are transmission channels for electric connection between the memory 21 and the PCIE controller 16. The switch 22 is an example of a first switch. A further detail of the switch 22 will be described below. The MC 23 is a controller that controls an operation of the memory evaluating board 2. The MC 23 controls, together with the switch 22, communication between the memory 21 and the memory evaluating apparatus 1. For example, the MC 23 switches an operation mode of the memory 21 to a single port or a dual port. In addition, for example, the MC 23 controls an operation of the switch 22. The MC 23 also outputs a dual port EN signal to the memory 21. The dual port EN signal is a signal indicating whether the dual port is enabled or disabled. The dual port EN signal is an example of a first signal. In addition, the MC 23 outputs a dual port SE signal to the switch 22. The dual port SE signal is a signal for controlling the operation of the switch 22. The dual port SE signal is an example of a second signal. A further detail of the MC 23 will be described below.

The evaluating system 100 of the present embodiment evaluates the memory 21 by using the single PCIE card slot 17 of the motherboard 1*a* and the single PCIE card edge 2*b* of the memory evaluating board 2. At this time, the evaluating system 100 of the present embodiment evaluates the memory 21 by using PCIE bifurcation related to links of lanes for the memory 21 and the PCIE controller 16. The lanes for the memory 21 and the PCIE controller 16 are transmission channels for electric connection between the memory 21 and the PCIE controller 16. The link is a unit in which a plurality of lanes are collectively handled. The PCIE bifurcation is a feature that divides one large link into a plurality of small links to reduce the number of lanes belonging to each link. By evaluating the memory 21 by using the PCIE bifurcation, not only a memory 21 of the single port but also a memory 21 of the dual port can be evaluated by using the single PCIE card slot 17 and the single PCIE card edge 2*b*. The memory 21 of the single port can be evaluated by using one small link, and the memory 21 of the dual port can be evaluated by using two small links. Therefore, the memory evaluating board 2 of the present embodiment does not necessarily need to have a plurality of PCIE card edges 2*b*, and it suffices when the memory evaluating board 2 has only the single PCIE card edge 2*b*.

Figure 2:
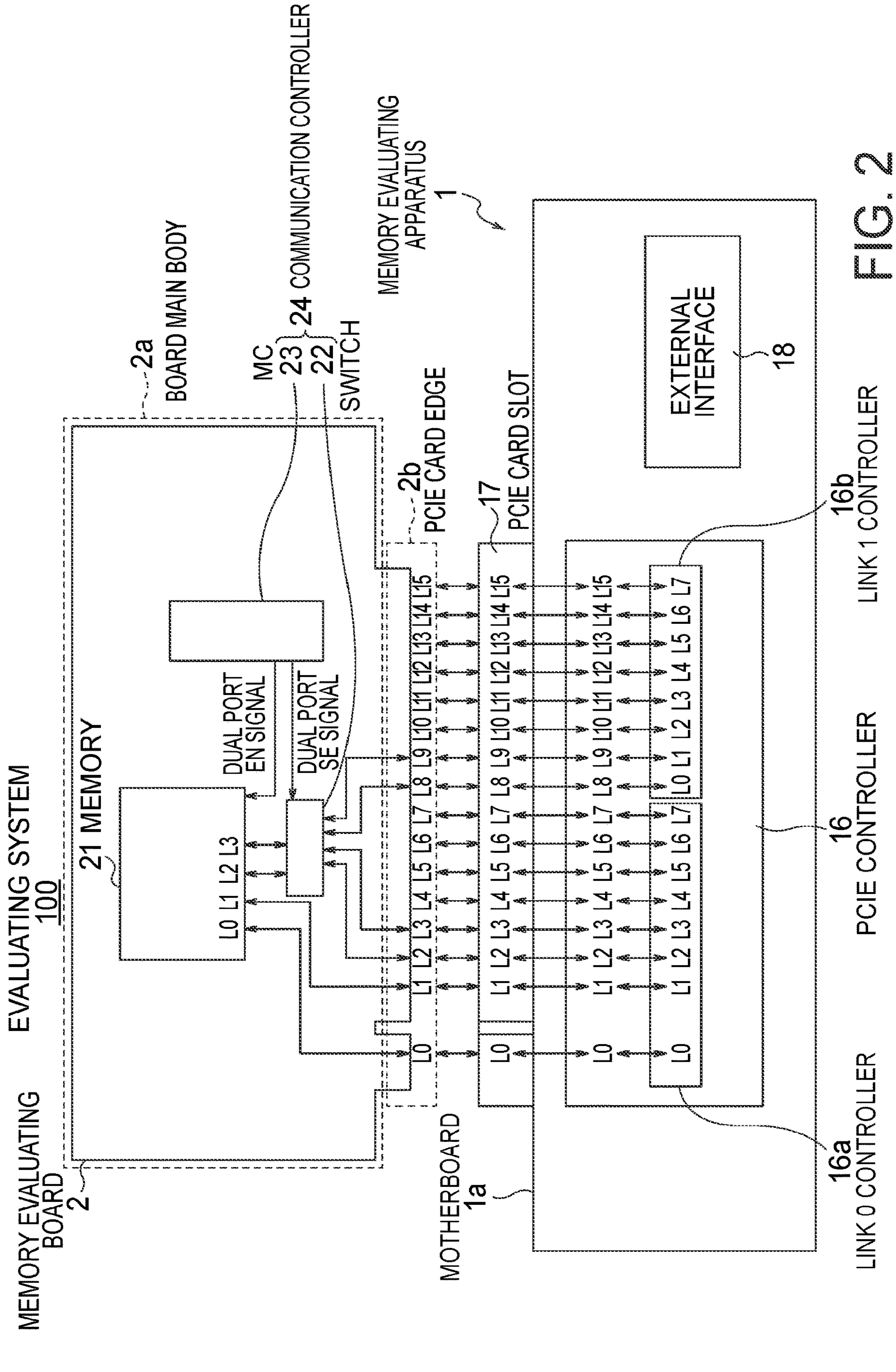
FIG. 2 is a schematic diagram illustrating a detailed connection relationship of the evaluating system according to the first embodiment.

FIG. 2 is a schematic diagram illustrating a detailed connection relationship of the evaluating system 100 according to the first embodiment.

The memory 21 of the present embodiment has four lanes (lanes L0 to L3).

The PCIE card edge 2*b* of the present embodiment has 16 lanes (lanes L0 to L15). Similarly, the PCIE card slot 17 of the present embodiment has 16 lanes (lanes L0 to L15). The lanes L0 to L15 of the PCIE card edge 2*b* can be respectively connected to the lanes L0 to L15 of the PCIE card slot 17.

When the operation mode of the memory 21 is the single port, the lanes L0 to L3 of the memory 21 configure one link (link 0). In the single port, the lanes L0 to L3 of the memory 21 are referred to as lanes L0 to L3 of the link 0. The memory 21 of the single port communicates with the PCIE controller 16 by using only the lanes L0 to L3 among the lanes L0 to L15.

When the operation mode of the memory 21 is the dual port, the lane L0 and the lane L1 configure one link. In addition, in the dual port, the lane L2 and the lane L3 configure another link. The former link is referred to as a "link 0", and the latter link is referred to as a "link 1". The lanes L0 and L1 of the memory 21 are examples of first lanes of the first memory. The lanes L2 and L3 of the memory 21 are examples of second lanes of the first memory. In the dual port, the lanes L0 and L1 of the memory 21 are referred to as lanes L0 and L1 of the link 0, and the lanes L2 and L3 of the memory 21 are referred to as lanes L0 and L1 of the link 1. In the dual port, the lanes L0 and L1 of the link 1 correspond to the lanes L2 and L3 of the link 0. The memory 21 of the dual port communicates with the PCIE controller 16 by using only the lanes L0, L1, L8, and L9 among the lanes L0 to L15.

The PCIE controller 16 of the present embodiment also has 16 lanes (lanes L0 to L15). The lanes L0 to L15 of the PCIE controller 16 are respectively connected to the lanes L0 to L15 of the PCIE card slot 17. When the PCIE bifurcation is disabled, the lanes L0 to L15 of the PCIE controller 16 configure one link (lanes L0 to L15 of a link 0).

When the PCIE bifurcation is enabled, the lanes L0 to L7 of the PCIE controller 16 configure one link (lanes L0 to L7 of a link 0). In addition, when the PCIE bifurcation is enabled, the lanes L8 to L15 of the PCIE controller 16 configure another link (lanes L0 to L7 of a link 1). In addition, when the PCIE bifurcation is enabled, the lanes L0 to L7 of the link 1 correspond to the lanes L8 to L15 of the link 0.

The PCIE controller 16 of the present embodiment includes a link 0 controller 16*a* and a link 1 controller 16*b*. The link 0 controller 16*a* has eight lanes (lanes L0 to L7). The link 1 controller 16*b* has eight lanes (lanes L0 to L7). The link 0 controller 16*a* is an example of a first controller. The link 1 controller 16*b* is an example of a second controller. The lanes L0 and L1 of the first controller are examples of first lanes of the first controller. The lanes L2 and L3 of the first controller are examples of second lanes of the first controller. The lanes L0 and L1 of the second controller are examples of first lanes of the second controller. The lanes L2 and L3 of the second controller are examples of second lanes of the second controller.

Subsequently, a lane connecting operation of the evaluating system 100 according to the present embodiment will be described.

The evaluating system 100 of the present embodiment can perform a bifurcation operation. The bifurcation operation refers to an operation for enabling or disabling the PCIE bifurcation. Control for enabling or disabling the PCIE bifurcation is performed by the CPU 11 that is executing the system software 31, for example.

The CPU 11 can output a command, to the external interface 18, for setting a port of the memory 21 to the single port or the dual port. When a command for setting the port of the memory 21 to the single port is received, the external interface 18 outputs a signal for storing a value “0” in a register of the MC 23 to the MC 23. When the signal is received, the MC 23 stores the value “0” in the register. When the value “0” is stored in the register, the MC 23 performs processing for setting the operation mode of the memory 21 to the single port. On the other hand, when a command for setting the port of the memory 21 to the dual port is received, the external interface 18 outputs a signal for storing a value “1” in the register of the MC 23 to the MC 23. When the signal is received, the MC 23 stores the value “1” in the register. When the value “1” is stored in the register, the MC 23 performs processing for setting the operation mode of the memory 21 to the dual port.

When the operation mode of the memory 21 is set to the single port, the MC 23 outputs, to the switch 22, the dual port SE signal for respectively connecting the lanes L2 and L3 of the memory 21 to the lanes L2 and L3 of the PCIE card edge 2*b*. When the dual port SE signal is received, the switch 22 respectively connects the lanes L2 and L3 of the memory 21 to the lanes L2 and L3 of the link 0. On the other hand, the switch 22 respectively connects the lanes L0 and L1 of the memory 21 to the lanes L0 and L1 of the link 0 by default. When the dual port SE signal is output, the MC 23 sets the operation mode of the memory 21 to the single port. When the operation mode of the memory 21 turns to the single port, the memory 21 and the PCIE controller 16 can perform communication via the lanes L0 to L3 of the memory 21 and the lanes L0 to L3 of the link 0. This communication is performed by using only the link 0 out of the links 0 and 1 of the PCIE controller 16.

When the operation mode of the memory 21 is set to the dual port, the MC 23 outputs, to the switch 22, the dual port SE signal for respectively connecting the lanes L2 and L3 of the memory 21 to the lanes L8 and L9 of the PCIE card edge 2*b*. When the dual port SE signal is received, the switch 22 respectively connects the lanes L2 and L3 of the memory 21 to the lanes L0 and L1 of the link 1. On the other hand, the switch 22 respectively connects the lanes L0 and L1 of the memory 21 to the lanes L0 and L1 of the link 0 by default. When the dual port SE signal is output, the MC 23 sets the operation mode of the memory 21 to the dual port. When the operation mode of the memory 21 turns to the dual port, the memory 21 and the PCIE controller 16 can perform communication via the lanes L0 to L3 of the memory 21 and the lanes L0 and L1 of the link 0 and the lanes L0 and L1 of the link 1. This communication is performed by using the links 0 and 1 of the PCIE controller 16.

FIG. 3 is a table representing a correspondence relationship between lanes of the evaluating system 100 and the PCIE bifurcation according to the first embodiment.

The evaluating system 100 of the present embodiment evaluates the memory 21 by using the PCIE bifurcation.

When the PCIE bifurcation is disabled, the lanes L0 to L15 of the PCIE controller 16 configure one link (the lanes L0 to L15 of the link 0). That is, the lanes L0 to L7 of the PCIE card slot 17 are connected to the lanes L0 to L7 of the link 0, and the lanes L8 to L15 of the PCIE card slot 17 are connected to the lanes L8 to L15 of the link 0.

When the PCIE bifurcation is enabled, the lanes L0 to L7 of the PCIE controller 16 configure one link (the lanes L0 to L7 of the link 0). In addition, when the PCIE bifurcation is enabled, the lanes L8 to L15 of the PCIE controller 16 configure another link (the lanes L0 to L7 of the link 1). That is, the lanes L0 to L7 of the PCIE card slot 17 are connected to the lanes L0 to L7 of the link 0, and the lanes L8 to L15 of the PCIE card slot 17 are connected to the lanes L0 to L7 of the link 1. When the CPU 11 executes the system software 31, the CPU 11 enables the PCIE bifurcation in a case where the memory 21 is the single port and also in a case where the memory 21 is the dual port.

Next, with reference to FIG. 4 and FIG. 5, the single port of the evaluating system 100 according to the first embodiment will be described.

Figure 4:
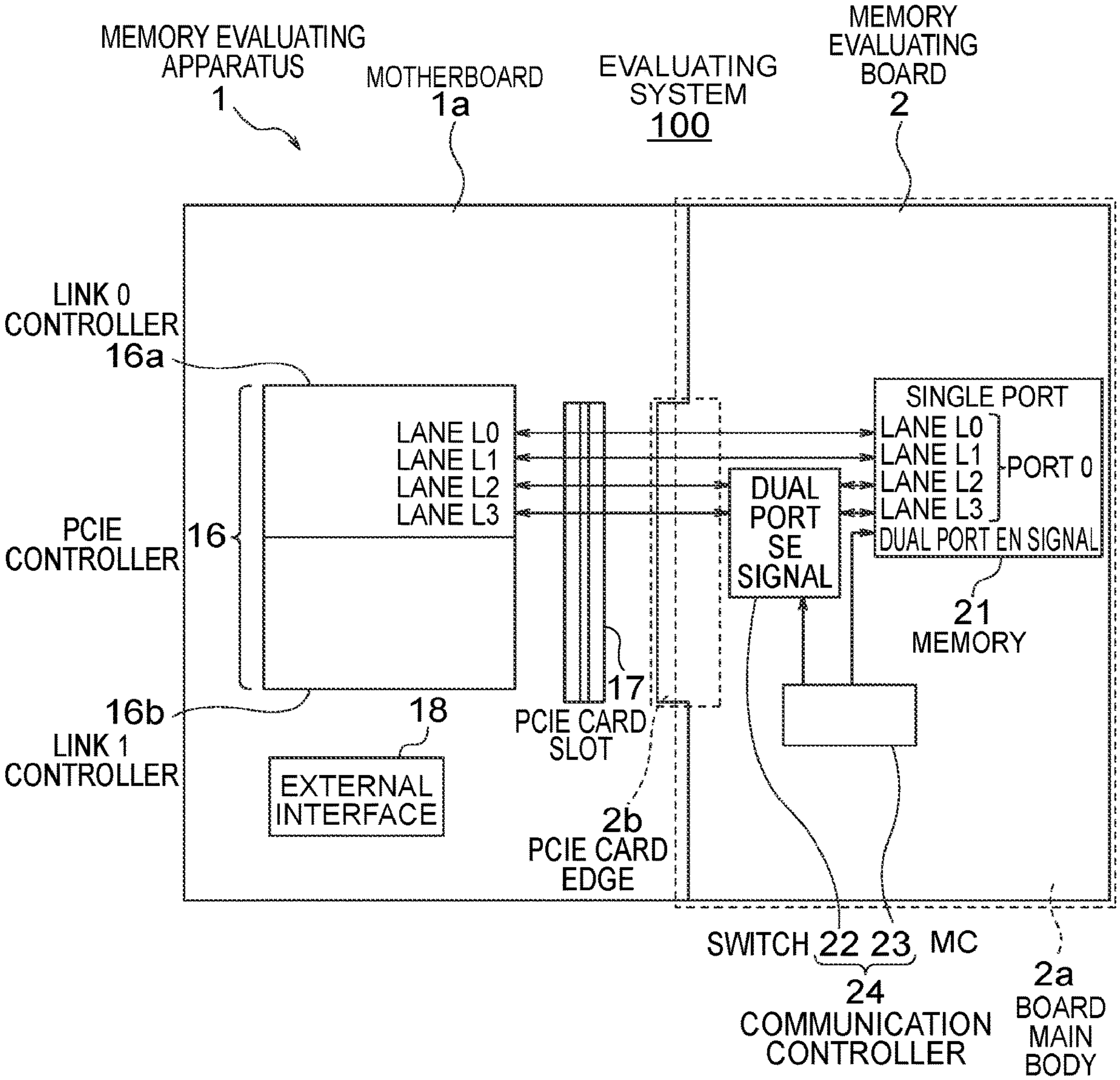
FIG. 4 is a schematic diagram illustrating lanes in a single port of the evaluating system according to the first embodiment.

FIG. 4 is a schematic diagram illustrating lanes in the single port of the evaluating system 100 according to the first embodiment. FIG. 4 illustrates the memory 21 of the single port. The memory 21 of the single port has lanes L0 to L3 of a port 0. The port 0 corresponds to the link 0. The PCIE controller 16 includes the link 0 controller 16*a* and the link 1 controller 16*b*. The lanes L0 to L3 of the link 0 controller 16*a* which are illustrated in FIG. 4 are the lanes L0 to L3 among the lanes L0 to L7 of the link 0.

Figure 5:
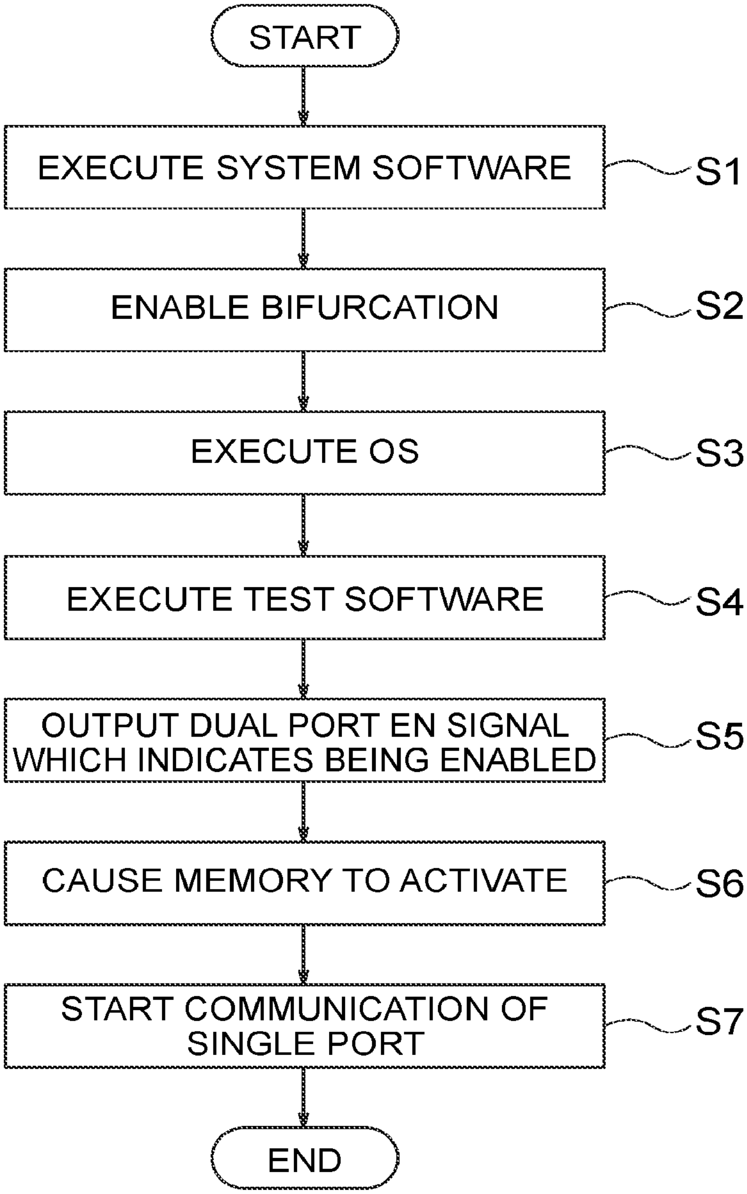
FIG. 5 is a flowchart illustrating a flow of operations in the single port of the evaluating system according to the first embodiment.

FIG. 5 is a flowchart illustrating a flow of operations in the single port of the evaluating system 100 according to the first embodiment. FIG. 5 illustrates a flow in a case where the operation mode of the memory 21 is set to the single port.

When a power source of the memory evaluating apparatus 1 is turned on, the CPU 11 executes the system software 31 (S1).

When the system software 31 is executed, the CPU 11 enables the PCIE bifurcation (S2).

When the PCIE bifurcation is enabled, the CPU 11 executes the OS 32 (S3).

When the OS 32 is executed, the CPU 11 executes the test software 33 (S4).

When the test software 33 is executed, since the CPU 11 communicates with the MC 23, the dual port EN signal which indicates being enabled is output to the MC 23 (S5). When the dual port EN signal which indicates being enabled is output, the operation mode of the memory 21 turns to the single port.

When the operation mode of the memory 21 turns to the single port, the memory 21 is activated as the single port (S6). That is, equipment that accesses the memory 21 is put into a state in which the memory 21 can be used.

When the memory 21 is activated, the memory 21 of the single port starts communication of the single port with the PCIE controller 16 via the port 0 (S7).

Next, with reference to FIG. 6 and FIG. 7, the dual port of the evaluating system 100 according to the first embodiment will be described.

Figure 6:
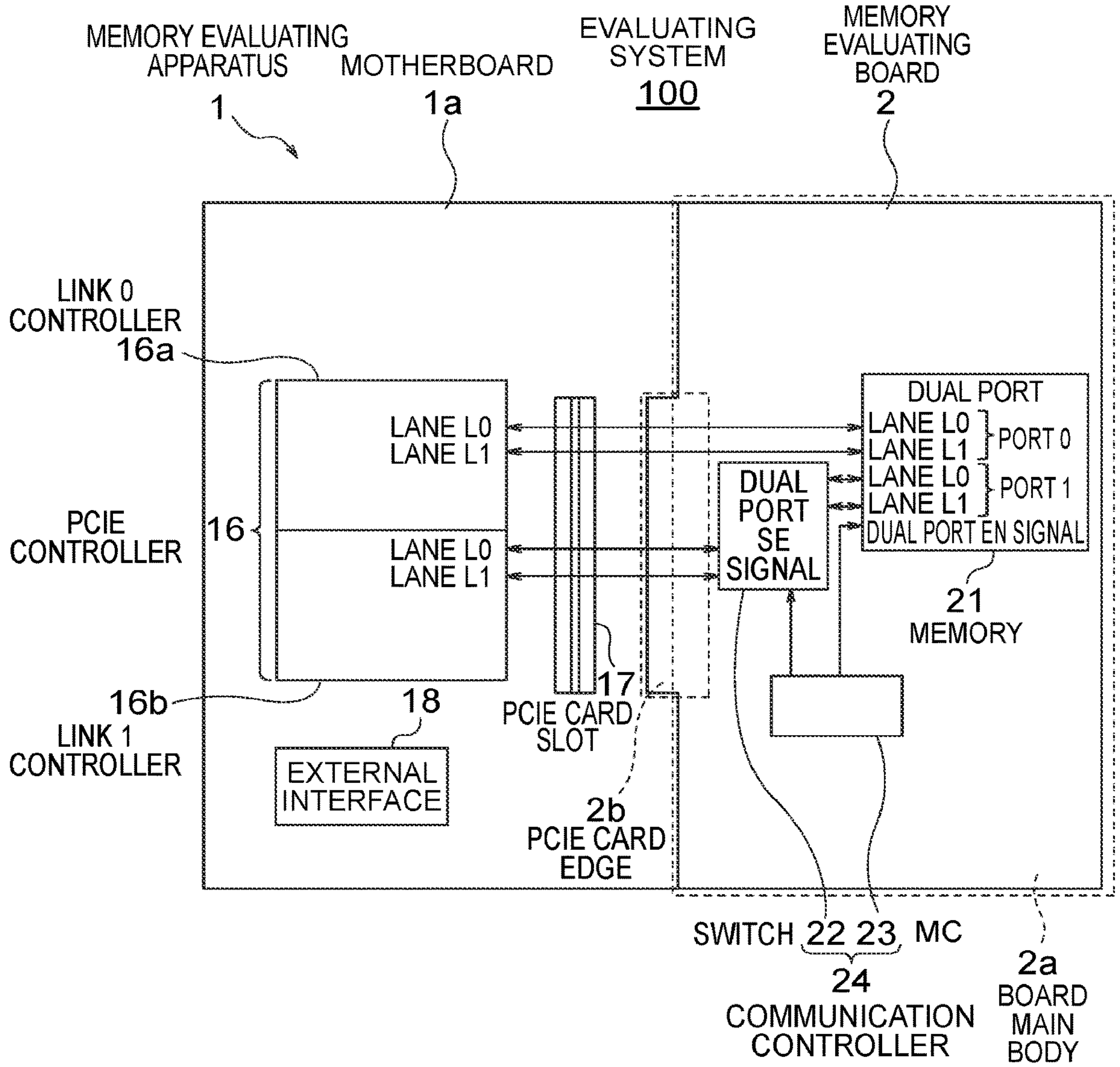
FIG. 6 is a schematic diagram illustrating lanes in a dual port of the evaluating system according to the first embodiment.

FIG. 6 is a schematic diagram illustrating lanes in the dual port of the evaluating system 100 according to the first embodiment. FIG. 6 illustrates the memory 21 of the dual port. The memory 21 of the dual port has lanes L0 and L1 of a port 0 and lanes L0 and L1 of a port 1. The port 0 corresponds to the link 0, and the port 1 corresponds to the link 1. The PCIE controller 16 includes the link 0 controller 16*a* and the link 1 controller 16*b*. Lanes L0 and L1 of the link 0 controller 16*a* which are illustrated in FIG. 6 are the lanes L0 and L1 among the lanes L0 to L7 of the link 0. Lanes L0 and L1 of the link 1 controller 16*b* which are illustrated in FIG. 6 are the lanes L0 and L1 among the lanes L0 to L7 of the link 1.

Figure 7:
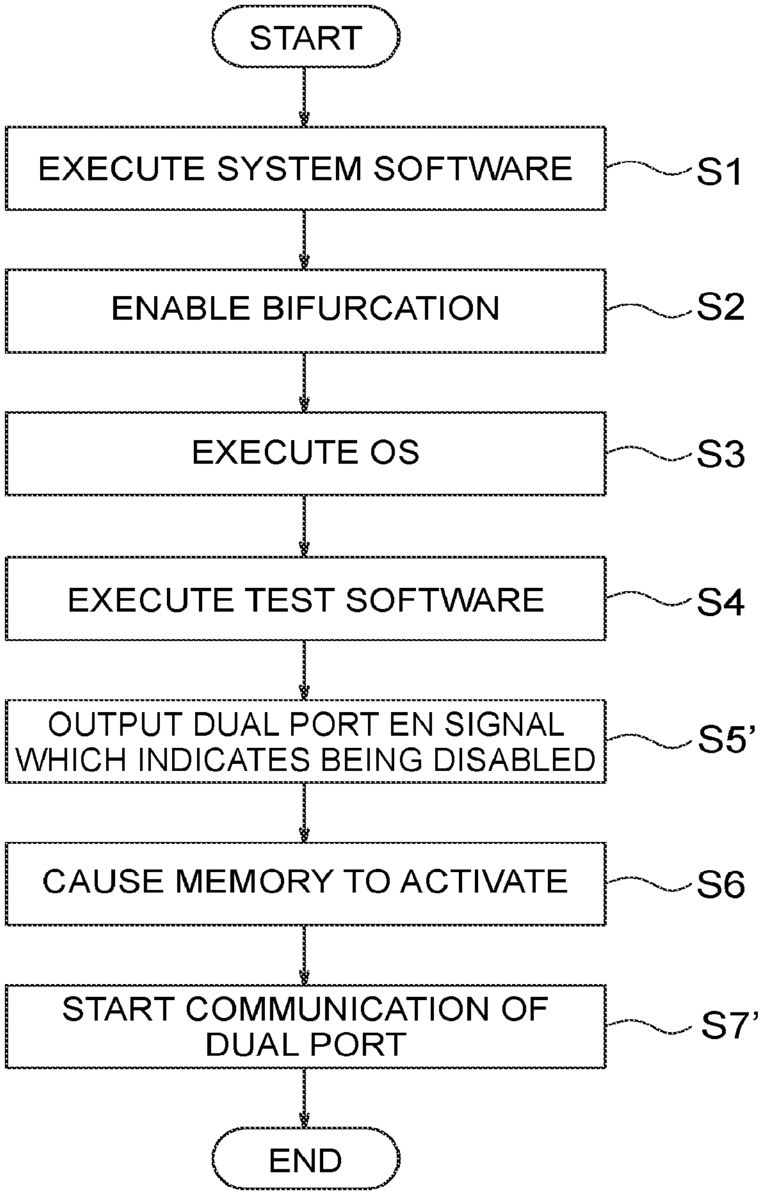
FIG. 7 is a flowchart illustrating a flow of operations in the dual port of the evaluating system according to the first embodiment.

FIG. 7 is a flowchart illustrating a flow of operations in the dual port of the evaluating system 100 according to the first embodiment. FIG. 7 illustrates a flow in a case where the operation mode of the memory 21 is set to the dual port.

When the power source of the memory evaluating apparatus 1 is turned on, the CPU 11 executes the system software 31 (S1).

When the system software 31 is executed, the CPU 11 enables the PCIE bifurcation (S2).

When the PCIE bifurcation is enabled, the CPU 11 executes the OS 32 (S3).

When the OS 32 is executed, the CPU 11 executes the test software 33 (S4).

When the test software 33 is executed, since the CPU 11 communicates with the MC 23, the dual port EN signal which indicates being disabled is output to the MC 23 (S5'). When the dual port EN signal which indicates being disabled is output, the operation mode of the memory 21 turns to the dual port.

When the operation mode of the memory 21 turns to the dual port, the memory 21 is activated as the dual port (S6). That is, the equipment that accesses the memory 21 is put into the state in which the memory 21 can be used.

When the memory 21 is activated, the memory 21 of the dual port starts communication of the dual port to the PCIE controller 16 via the ports 0 and 1 (S7').

Subsequently, details of the flows in FIG. 5 and FIG. 7 will be additionally described.

To evaluate the memory 21 of the dual port, the evaluating system 100 of the present embodiment uses the single PCIE card slot 17 of the single motherboard 1*a* and the single PCIE card edge 2*b* of the single memory evaluating board 2.

When the system software 31 of the present embodiment is executed by the CPU 11, in a case where the PCIE bifurcation is enabled in S1 in FIG. 5 or FIG. 7, the CPU 11 handles the PCIE card slot 17 to which the PCIE card edge 2*b* of the memory evaluating board 2 is connected as the PCIE card slot 17 that can be used for the single port and the dual port.

For example, when the link 0 controller 16*a* operates and the link 1 controller 16*b* stops, since the memory 21 is the single port, after S5 in FIG. 5, the CPU 11 handles a signal between the PCIE card edge 2*b* and the PCIE card slot 17 as a signal for the single port. This makes it possible for the CPU 11 to evaluate the memory 21 of the single port.

When both the link 0 controller 16*a* and the link 1 controller 16*b* operate, since the memory 21 is the dual port, after S5' in FIG. 7, the CPU 11 handles a signal between the PCIE card edge 2*b* and the PCIE card slot 17 as a signal for the dual port. This makes it possible for the CPU 11 to evaluate the memory 21 of the dual port.

When the test software 33 is executed by the CPU 11, the CPU 11 can control the memory 21 via the MC 23 even after S7 in FIG. 5 or S7' in FIG. 7. This makes it possible to continue an evaluation (test) of the memory 21 by switching the single port and the dual port of the memory 21. Control on the memory 21 can be performed by using a reset signal of the memory 21 or a signal of the PCIE.

The PCIE controller 16 of the present embodiment is a x16 controller, but may be other controllers (for example, a x8 controller). In this case too, it is possible to perform PCIE bifurcation similar to the PCIE bifurcation of the present embodiment.

As described above, by switching a connection destination of a particular lane of the memory 21 between the link 0 controller 16*a* and the link 1 controller 16*b*, the evaluating system 100 of the present embodiment evaluates the memory 21 by the single PCIE card slot 17 and the single PCIE card edge 2*b*. This makes it possible to evaluate the memory 21 of the dual port without using an extension cable, and improve a communication quality between the memory 21 and the memory evaluating apparatus 1.

Second Embodiment

Figure 8:
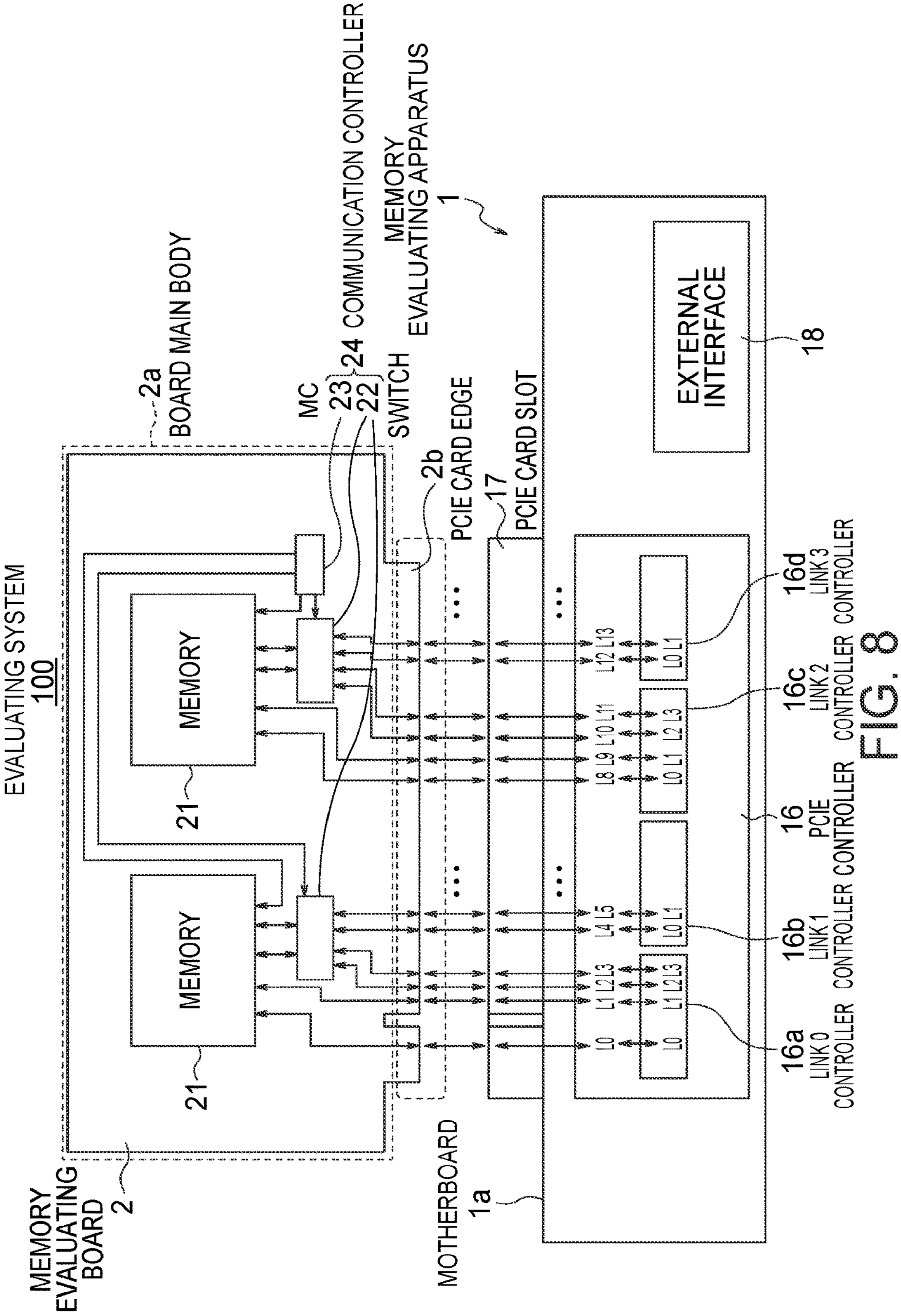
FIG. 8 is a schematic diagram illustrating a configuration of an evaluating system according to a second embodiment.

FIG. 8 is a schematic diagram illustrating a configuration of an evaluating system 100 of a second embodiment.

The evaluating system 100 of the present embodiment includes two memories 21, two switches 22, and a single MC 23 on a board main body 2*a* of a single memory evaluating board 2. A left switch 22 is provided for a left memory 21 in FIG. 8. A right switch 22 is provided for a right memory 21 in FIG. 8. The MC 23 is shared for these memories 21 and switches 22. The left memory 21 is an example of a first memory. The left switch 22 is an example of a first switch. The right memory 21 is an example of a second memory. The right switch 22 is an example of a second switch. These switches 22 and the MC 23 are examples of communication controllers. Functions of these memories 21, the switches 22, and the MC 23 are roughly the same as the functions of the memory 21, the switch 22, and the MC 23 of the first embodiment.

The evaluating system 100 of the present embodiment evaluates the two memories 21 by using the single PCIE card slot 17 of the motherboard 1*a* and the single PCIE card edge 2*b* of the memory evaluating board 2. At this time, the evaluating system 100 of the present embodiment performs evaluation on these memories 21 by using PCIE bifurcation that divides one link into four links. This makes it possible for not only the memory 21 of the single port but also the memory 21 of the dual port to perform the evaluation by using the single PCIE card slot 17 and the single PCIE card edge 2*b*. Therefore, the memory evaluating board 2 of the present embodiment does not necessarily need to include a plurality of the PCIE card edges 2*b*, and it suffices when the memory evaluating board 2 includes only the single PCIE card edge 2*b*.

Each of the memories 21 of the present embodiment has four lanes (that are lanes L0 to L3 from left to right). In a x4 single port, in each of the memories 21, the lanes L0 to L3 are caused to collectively operate. In a x2 dual port, in each of the memories 21, the lanes L0 and L1 configuring one link are caused to collectively operate, and the lanes L2 and L3 configuring another link are caused to collectively operate, so that these links are caused to independently operate. In the dual port, the former link and the latter link of the left memory 21 are referred to as a "link 0" and a "link 1", and the former link and the latter link of the right memory 21 are referred to as a "link 2" and a "link 3", respectively. On the other hand, in the single port, in each of the memories 21, the lanes L0 to L3 configure one link (a "link 0" or a "link" 2). The lanes L0 and L1 of the left memory 21 are examples of first lanes of the first memory. The lanes L2 and L3 of the left memory 21 are examples of second lanes of the first memory. The lanes L0 and L1 of the right memory 21 are examples of first lanes of the second memory. The lanes L2 and L3 of the right memory 21 are examples of second lanes of the second memory.

In the single port, the lanes L0 to L3 of the left memory 21 are referred to as lanes L0 to L3 of the link 0. On the other hand, in the dual port, the lanes L0 and L1 of the left memory 21 are referred to as lanes L0 and L1 of the link 0, and the lanes L2 and L3 of the left memory 21 are referred to as lanes L0 and L1 of the link 1. Therefore, in the lanes L0 to L3 of the left memory 21, the lanes L0 and L1 of the link 1 correspond to the lanes L2 and L3 of the link 0.

In addition, in the single port, the lanes L0 to L3 of the right memory 21 are referred to as lanes L0 to L3 of the link 2. On the other hand, in the dual port, the lanes L0 and L1 of the right memory 21 are referred to as lanes L0 and L1 of the link 2, and the lanes L2 and L3 of the right memory 21 are referred to as lanes L0 and L1 of the link 3. Therefore, in the lanes L0 to L3 of the right memory 21, the lanes L0 and L1 of the link 3 correspond to the lanes L2 and L3 of the link 2.

A configuration of the PCIE card edge 2*b* and the PCIE card slot 17 of the present embodiment is similar to the configuration of the PCIE card edge 2*b* and the PCIE card slot 17 of the first embodiment. Therefore, the PCIE card edge 2*b* of the present embodiment has 16 lanes (that are lanes L0 to L15 from left to right). Similarly, the PCIE card slot 17 of the present embodiment has 16 lanes (that are lanes L0 to L15 from left to right). The lanes L0 to L15 of the PCIE card edge 2*b* are respectively connected to the lanes L0 to L15 of the PCIE card slot 17. The left memory 21 of the single port communicates with the PCIE controller 16 by using only the lanes L0 to L3 among the lanes L0 to L15. The left memory 21 of the dual port communicates with the PCIE controller 16 by using only the lanes L0, L1, L4, and L5 among the lanes L0 to L15. The right memory 21 of the single port communicates with the PCIE controller 16 by using only the lanes L8 to L 11 among the lanes L0 to L15. The right memory 21 of the dual port communicates with the PCIE controller 16 by using only the lanes L8, L9, L12, and L13 among the lanes L0 to L15.

The PCIE controller 16 of the present embodiment also has 16 lanes (that are lanes L0 to L15 from left to right). The lanes L0 to L15 of the PCIE controller 16 are respectively connected to the lanes L0 to L15 of the PCIE card edge 2*b* and to the lanes L0 to L15 of the PCIE card slot 17. When the PCIE bifurcation is disabled, the lanes L0 to L15 of the PCIE controller 16 turn to the lanes L0 to L15 of the link 0. When the PCIE bifurcation is enabled, the lanes L0 to L3 of the PCIE controller 16 turn to lanes L0 to L3 of the link 0, the lanes L4 to L7 of the PCIE controller 16 turn to lanes L0 to L3 of the link 1, the lanes L8 to L11 of the PCIE controller 16 turn to lanes L0 to L3 of the link 2, and the lanes L12 to L15 of the PCIE controller 16 turn to lanes L0 to L3 of the link 3 (FIG. 8). Therefore, in the lanes L0 to L15 of the PCIE controller 16, the lanes L0 to L3 of the link 1, the lanes L0 to L3 of the link 2, and the lanes L0 to L3 of the link 3 respectively correspond to the lanes L4 to L7 of the link 0, the lanes L8 to L11 of the link 0, and the lanes L12 to L15 of the link 0.

The PCIE controller 16 of the present embodiment includes the link 0 controller 16*a*, the link 1 controller 16*b*, a link 2 controller 16*c*, and a link 3 controller 16*d*. The link 0 controller 16*a* has four lanes (the lanes L0 to L3 of the link 0 (the lanes of the PCIE controller 16)). The link 1 controller 16*b* has four lanes (the lanes L0 to L3 of the link 1 (the lanes L4 to L7 of the PCIE controller 16)). The link 2 controller 16*c* has four lanes (the lanes L0 to L3 of the link 2 (the lanes L8 to L11 of the PCIE controller 16)). The link 3 controller 16*d* has four lanes (the lanes L0 to L3 of the link 3 (the lanes L12 to L15 of the PCIE controller 16)). The link 0 controller 16*a*, the link 1 controller 16*b*, the link 2 controller 16*c*, and the link 3 controller 16*d* are examples of first to fourth controllers.

According to the present embodiment, the PCIE bifurcation is enabled when the left memory 21 is the single port and also when the left memory 21 is the dual port. The left memory 21 of the single port then communicates with the link 0 controller 16*a* by using the lanes L0 to L3 of the link 0. On the other hand, the left memory 21 of the dual port communicates with the link 0 controller 16*a* by using only the lanes L0 and L1 among the lanes L0 to L3 of the link 0, and communicates with the link 1 controller 16*b* by using only the lanes L0 and L1 among the lanes L0 to L3 of the link 1. The lanes L0 and L1 of the link 0 are examples of first lanes of the first controller. The lanes L2 and L3 of the link 0 are examples of second lanes of the first controller. The lanes L0 and L1 of the link 1 are examples of first lanes of the second controller. The lanes L2 and L3 of the link 1 are examples of second lanes of the second controller.

Similarly, according to the present embodiment, the PCIE bifurcation is enabled when the right memory 21 is the single port and also when the right memory 21 is the dual port. The right memory 21 of the single port then communicates with the link 2 controller 16*c* by using the lanes L0 to L3 of the link 2. On the other hand, the right memory 21 of the dual port communicates with the link 2 controller 16*c* by using only the lanes L0 and L1 among the lanes L0 to L3 of the link 2, and communicates with the link 3 controller 16*d* by using only the lanes L0 and L1 among the lanes L0 to L3 of the link 3. The lanes L0 and L1 of the link 2 are examples of first lanes of a third controller. The lanes L2 and L3 of the link 2 are examples of second lanes of the third controller. The lanes L0 and L1 of the link 3 are examples of first lanes of a fourth controller. The lanes L2 and L3 of the link 3 are examples of second lanes of the fourth controller.

Subsequently, further details of the PCIE bifurcation, the single port, and the dual port of the present embodiment will be described.

The evaluating system 100 of the present embodiment can enable or disable the PCIE bifurcation. The control for enabling or disabling the PCIE bifurcation is performed by the CPU 11 that is executing the system software 31, for example.

When the test software 33 is executed by the CPU 11, the CPU 11 can output a command for setting the port of each of the memories 21 to the single port or the dual port. For example, when a command for setting the port of the left memory 21 to the single port is received, the external interface 18 outputs a signal for storing a value "0" in a register of the MC 23. When the signal is received, the MC 23 stores the value "0" in the register. When the value "0" is stored in the register, the MC 23 performs processing of the left memory 21 of the single port. On the other hand, when a command for setting the port of the left memory 21 to the dual port is received, the external interface 18 outputs a signal for storing a value "1" in the above register of the MC 23. When the signal is received, the MC 23 stores the value "1" in the register. When the value "1" is stored in the register, the MC 23 performs processing of the left memory 21 of the dual port. The same also applies to the right memory 21.

The MC 23 outputs the dual port EN signal to each of the memories 21. The dual port EN signal is a signal for setting the operation mode of each of the memories 21 to the single port or the dual port. The dual port EN signal to the left memory 21 is an example of a first signal. The dual port EN signal to the right memory 21 is an example of a third signal.

The MC 23 also outputs the dual port SE signal to each of the switches 22. The dual port SE signal is a signal for controlling the operation of each of the switches 22. The dual port SE signal to the left switch 22 is an example of a second signal. The dual port SE signal to the right switch 22 is an example of a fourth signal.

When the operation mode of the left memory 21 is set to the single port, the MC 23 outputs, to the left switch 22, the dual port SE signal for respectively connecting the lanes L2 and L3 of the left memory 21 to the lanes L2 and L3 of the PCIE card edge 2*b*. When the dual port SE signal is received, the left switch 22 respectively connects the lanes L2 and L3 of the left memory 21 to the lanes L2 and L3 of the link 0. On the other hand, the left switch 22 respectively connects the lanes L0 and L1 of the left memory 21 to the lanes L0 and L1 of the link 0 by default. When the dual port SE signal is output, the MC 23 sets the dual port EN signal to be inactive to set the operation mode of the left memory 21 to the single port. When the operation mode of the left memory 21 is set to the single port, the left memory 21 and the PCIE controller 16 can perform communication between the lanes L0 to L3 of the left memory 21 and the lanes L0 to L3 of the link 0, respectively. This communication is performed by using only the link 0 among the links 0 to 3 of the PCIE controller 16.

When the operation mode of the left memory 21 is set to the dual port, the MC 23 outputs, to the left switch 22, the dual port SE signal for respectively connecting the lanes L2 and L3 of the left memory 21 to the lanes L4 and L5 of the PCIE card edge 2*b*. When the dual port SE signal is received, the left switch 22 respectively connects the lanes L2 and L3 of the left memory 21 to the lanes L0 and L1 of the link 1. On the other hand, the left switch 22 respectively connects the lanes L0 and L1 of the left memory 21 to the lanes L0 and L1 of the link 0 by default. When the dual port SE signal is output, the MC 23 sets the dual port EN signal to be active to set the operation mode of the left memory 21 to the dual port. When the operation mode of the left memory 21 is set to the dual port, the left memory 21 and the PCIE controller 16 can perform communication between the lanes L0 to L3 of the left memory 21 and the lanes L0 and L1 of the link 0 and the lanes L0 and L1 of the link 1. This communication is performed by using only the links 0 and 1 among the links 0 to 3 of the PCIE controller 16.

When the operation mode of the right memory 21 is set to the single port, the MC 23 outputs, to the right switch 22, the dual port SE signal for respectively connecting the lanes L2 and L3 of the right memory 21 to the lanes L10 and L11 of the PCIE card edge 2*b*. When the dual port SE signal is received, the right switch 22 respectively connects the lanes L2 and L3 of the right memory 21 to the lanes L2 and L3 of the link 2. On the other hand, the right switch 22 respectively connects the lanes L0 and L1 of the memory 21 to the lanes L0 and L1 of the link 2 by default. When the dual port SE signal is output, the MC 23 sets the dual port EN signal to be inactive to set the operation mode of the right memory 21 to the single port. When the operation mode of the right memory 21 is set to the single port, the right memory 21 and the PCIE controller 16 can perform communication between the lanes L0 to L3 of the right memory 21 and the lanes L0 to L3 of the link 2. This communication is performed by using only the link 2 among the links 0 to 3 of the PCIE controller 16.

When the operation mode of the right memory 21 is set to the dual port, the MC 23 outputs, to the right switch 22, the dual port SE signal for respectively connecting the lanes L2 and L3 of the right memory 21 to the lanes L12 and L13 of the PCIE card edge 2*b*. When the dual port SE signal is received, the right switch 22 respectively connects the lanes L2 and L3 of the right memory 21 to the lanes L0 and L1 of the link 3. On the other hand, the right switch 22 respectively connects the lanes L0 and L1 of the right memory 21 to the lanes L0 and L1 of the link 2 by default. When the dual port SE signal is output, the MC 23 sets the dual port EN signal to be active to set the operation mode of the right memory 21 to the dual port. When the operation mode of the right memory 21 is set to the dual port, the right memory 21 and the PCIE controller 16 can perform communication between the lanes L0 to L3 of the right memory 21 and the lanes L0 and L1 of the link 2 and the lanes L0 and L1 of the link 3. This communication is performed by using only the links 2 and 3 among the links 0 to 3 of the PCIE controller 16.

When the CPU 11 executes the test software 33, the CPU 11 can evaluate each of the memories 21 by accessing each of the memories 21 via the PCIE controller 16. For example, when the left memory 21 is the single port, the CPU 11 can evaluate the left memory 21 by accessing the left memory 21 via only the link 0 controller 16*a* in the PCIE controller 16. When the left memory 21 is the dual port, the CPU 11 can evaluate the left memory 21 by accessing the left memory 21 via only the link 0 controller 16*a* and the link 1 controller 16*b* in the PCIE controller 16. The same also applies to the right memory 21.

As described above, by switching a connection destination of a particular lane of the left memory 21 between the link 0 controller 16*a* and the link 1 controller 16*b*, the evaluating system 100 of the present embodiment evaluates the left memory 21 by the single PCIE card slot 17 and the single PCIE card edge 2*b*. Furthermore, the evaluating system 100 of the present embodiment evaluates the right memory 21 by the single PCIE card slot 17 and the single PCIE card edge 2*b* by switching a connection destination of a particular lane of the right memory 21 between the link 2 controller 16*c* and the link 3 controller 16*d*. This makes it possible to evaluate each of the memories 21 of the dual port without using an extension cable, and improve a communication quality between each of the memories 21 and the memory evaluating apparatus 1.

In addition, according to the present embodiment, by mounting the two memories 21 on the single memory evaluating board 2, the single memory evaluating apparatus 1 and the single memory evaluating board 2 evaluate the two memories 21. This makes it possible to reduce the number of the memory evaluating apparatuses 1 and the number of the memory evaluating boards 2 which are to be used to evaluate the plurality of memories 21.

The evaluating system 100 of the present embodiment controls the two memories 21 by the mutually different dual port EN signals. However, instead of those signals, the evaluating system 100 of the present embodiment may control the two memories 21 by the same dual port EN signal. As a result, the ports of the two memories 21 turn to the single port or the dual port at the same time. In this case, the evaluating system 100 of the present embodiment may control the two switches 22 by the same dual port SE signal.

COMPARATIVE EXAMPLE

Figure 9:
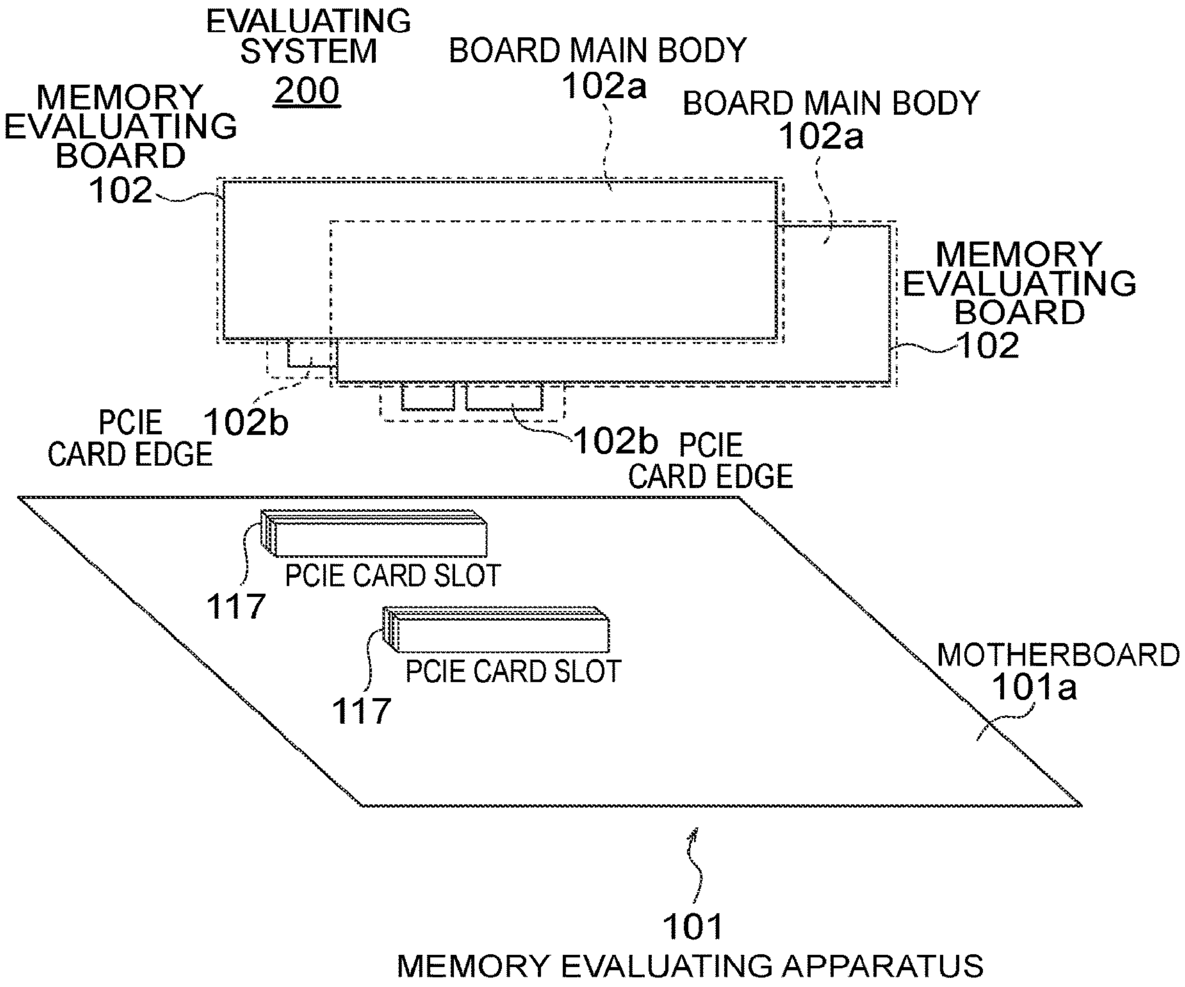
FIG. 9 is a perspective view illustrating a configuration of an evaluating system according to a comparative example.

FIG. 9 is a perspective view illustrating a configuration of an evaluating system 200 according to a comparative example.

A memory evaluating apparatus 101 of the comparative example includes a motherboard 101*a* on which two PCIE card slots 117 are provided. This makes it possible to connect two memory evaluating boards 102 to the motherboard 101*a* at the same time. In the comparative example, each of these memory evaluating boards 102 includes a board main body 102*a* and a PCIE card edge 102*b*. The PCIE card edge 102*b* of one of the memory evaluating boards 102 is connected to one of the PCIE card slots 117, and the PCIE card edge 102*b* of the other of the memory evaluating boards 102 is connected to the other of the PCIE card slots 117.

In the comparative example, the two PCIE card slots 117 extend in a left and right direction of a sheet surface and are adjacent to each other in a depth direction of the sheet surface. Therefore, the two memory evaluating boards 102 also extend in the left and right direction of the sheet surface and are adjacent to each other in the depth direction of the sheet surface.

Figure 10:
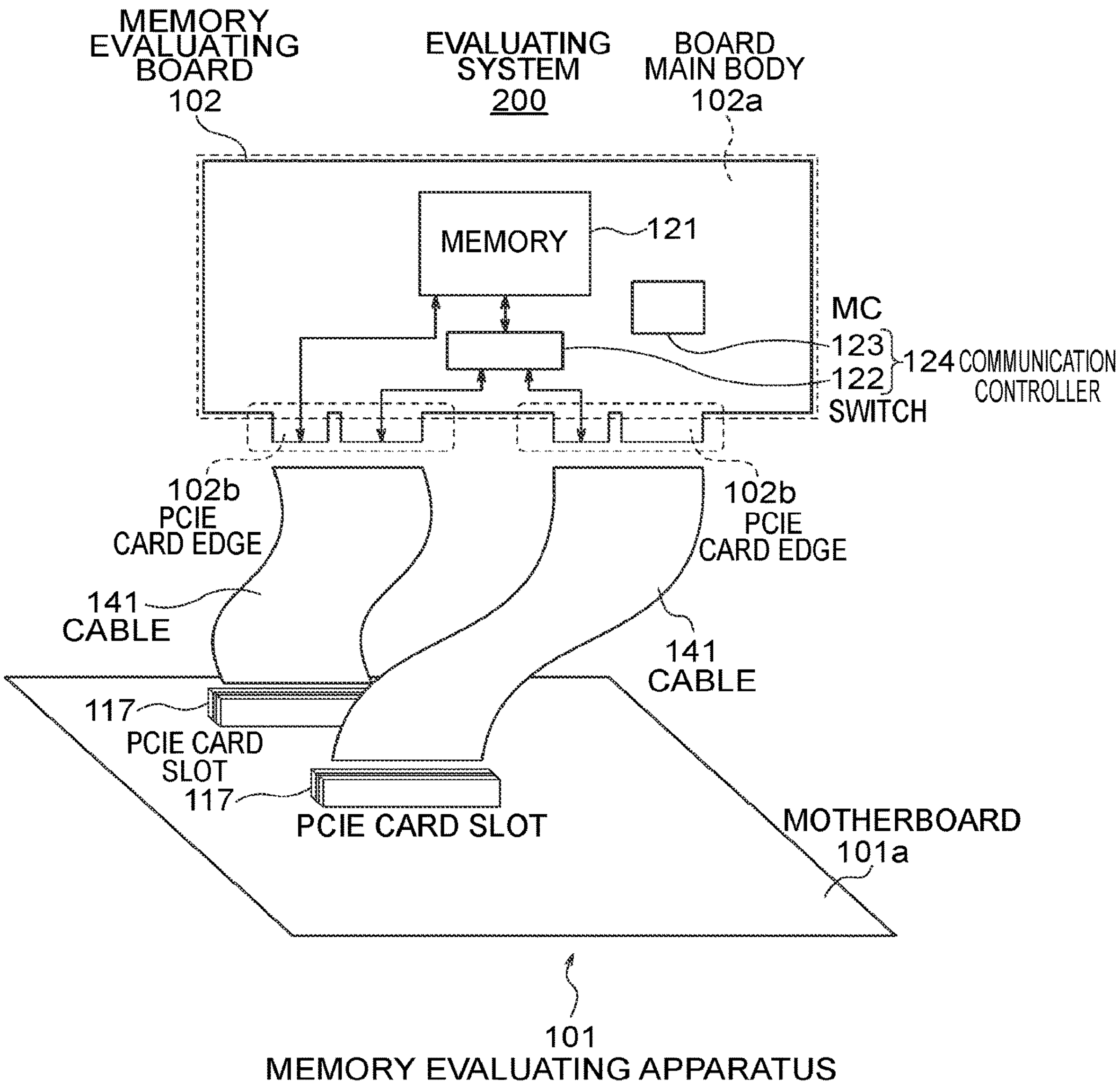
FIG. 10 is a perspective view illustrating a configuration of an evaluating system according to another comparative example.

FIG. 10 is a perspective view illustrating a configuration of an evaluating system 200 according to another comparative example.

Herein, the memory evaluating boards 102 of the comparative example include the single board main body 102*a*, the two PCIE card edges 102*b*, a single memory 121, a single switch 122, and a single MC 123. In addition, as described above, the memory evaluating apparatus 101 of the comparative example includes the motherboard 101*a* on which the two PCIE card slots 117 are provided.

Examples of types of a port of the memory 121 include, for example, a x4 single port which causes four lanes of the memory 121 to operate as a single x4 port, and a x2 dual port which causes the four lanes of the memory 121 to operate as two x2 ports. To evaluate the memory 121 of the dual port, for example, the memory 121 needs to be mounted on the memory evaluating board 102 having the two PCIE card edges 102*b*, and the two PCIE card edges 102*b* of the memory evaluating board 102 need to be connected to the two PCIE card slots 117 of the motherboard 101*a*. To evaluate the memory 121 of the dual port, the evaluating system 200 of the comparative example includes the motherboard 101*a* having the two PCIE card slots 117, and the memory evaluating board 102 having the two PCIE card edges 102*b*.

In the comparative example, the two PCIE card slots 117 are adjacent to each other in the depth direction of the sheet surface, but the two PCIE card edges 102*b* are adjacent to each other in the left and right direction of the sheet surface. Therefore, to connect these PCIE card slots 117 to these PCIE card edges 102*b*, one of the PCIE card slots 117 needs to be connected to one of the PCIE card edges 102*b* by an extension cable 141, and the other of the PCIE card slots 117 needs to be connected to the other of the PCIE card edges 102*b* by another extension cable 141.

However, when the PCIE card edge 102*b* is connected to the PCIE card slot 117 by the extension cable 141, a communication quality between the memory 121 and the memory evaluating apparatus 101 may degrade due to the extension cable 141. For example, to connect the two PCIE card edges 102*b* to the two PCIE card slots 117, since a shape of each of the extension cables 141 is distorted, the communication quality between the memory 121 and the memory evaluating apparatus 101 may degrade. In addition, since a length of each of the extension cables 141 is long, the communication quality between the memory 121 and the memory evaluating apparatus 101 may degrade. As a result, it may not be possible to perform high speed communication between the memory 121 and the memory evaluating apparatus 101.

While certain embodiments have been described, these embodiments have been presented by way of example only, and are not intended to limit the scope of the inventions. Indeed, the novel boards and methods described herein may be embodied in a variety of other forms; furthermore, various omissions, substitutions and changes in the form of the novel boards and methods described herein may be made without departing from the spirit of the inventions. The accompanying claims and their equivalents are intended to cover such forms or modifications as would fall within the scope and spirit of the inventions.

The invention claimed is:

1. A memory evaluating board comprising:

a first portion configured to mount a first memory including first and second lanes thereto;

a second portion including an edge configured to connect to a slot of a memory evaluating apparatus that includes a first controller including first and second lanes and a second controller including first and second lanes; and a communication controller mounted to the first portion, and configured to control communication between the first memory and the memory evaluating apparatus, wherein the first lane of the first memory is configured to be directly connected to the first lane of the first controller, the communication controller includes:

a first switch directly connected to the first memory via the second lane of the first memory, and configured to connect the second lane of the first memory to either the second lane of the first controller or the first lane of the second controller; and a micro controller directly connected to the first memory, and configured to set an operation mode of the first memory to a single port or a dual port, and control the first switch, in a case where the first memory is the single port in a state where the edge is connected to the slot, the communication controller is configured to control the communication such that the communication is performed between the first lane of the first memory and the first lane of the first controller, and the communication is performed between the second lane of the first memory and the second lane of the first controller, and in a case where the first memory is the dual port in the state where the edge is connected to the slot, the communication controller is configured to control the communication such that the communication is performed between the first lane of the first memory and the first lane of the first controller, and the communication is performed between the second lane of the first memory and the first lane of the second controller.

2. The board of claim 1, wherein the micro controller is configured to set the operation mode of the first memory to the single port or the dual port by outputting a first signal to the first memory, and control the first switch by outputting a second signal to the first switch.

3. The board of claim 1, wherein the first and second controllers are provided in a single controller to which bifurcation that divides one link into two links is applicable.

4. The board of claim 1, wherein the communication controller is further configured to control the communication between the first memory and the memory evaluating apparatus, based on a signal received from the memory evaluating apparatus.

5. The board of claim 1, wherein the first portion is configured to mount a second memory including first and second lanes thereto, the edge of the second portion is configured to connect to the slot of the memory evaluating apparatus that further includes a third controller including first and second lanes and a fourth controller including first and second lanes, the communication controller is further configured to control communication between the second memory and the memory evaluating apparatus, in a case where the second memory is the single port in the state where the edge is connected to the slot, the communication controller is further configured to control the communication such that the communication is performed between the first lane of the second memory and the first lane of the third controller, and the communication is performed between the second lane of the second memory and the second lane of the third controller, and in a case where the second memory is the dual port in the state where the edge is connected to the slot, the communication controller is further configured to control the communication such that the communication is performed between the first lane of the second memory and the first lane of the third controller, and the communication is performed between the first lane of the second memory and the first lane of the fourth controller.

6. The board of claim 5, wherein the communication controller includes:

the first switch configured to connect the second lane of the first memory to either the second lane of the first controller or the first lane of the second controller;

a second switch configured to connect the second lane of the second memory to either the second lane of the third controller or the first lane of the fourth controller; and the micro controller configured to set the operation mode of the first memory to the single port or the dual port, set an operation mode of the second memory to the single port or the dual port, and control the first and second switches.

7. The board of claim 6, wherein the micro controller is configured to set the operation mode of the first memory to the single port or the dual port by outputting a first signal to the first memory, control the first switch by outputting a second signal to the first switch, set the operation mode of the second memory to the single port or the dual port by outputting a third signal to the second memory, and control the second switch by outputting a fourth signal to the second switch.

8. The board of claim 5, wherein the first to fourth controllers are provided in a single controller to which bifurcation that divides one link into four links is applicable.

9. The board of claim 5, wherein the communication controller is further configured to control the communication between the first and second memories and the memory evaluating apparatus, based on a signal received from the memory evaluating apparatus.

10. A memory evaluating method using a memory evaluating board including a first portion configured to mount a first memory including first and second lanes thereto, a second portion including an edge configured to connect to a slot of a memory evaluating apparatus that includes a first controller including first and second lanes and a second controller including first and second lanes, and a communication controller mounted to the first portion and configured to control communication between the first memory and the memory evaluating apparatus, the method comprising:

in a case where the first memory is a single port in a state where the edge is connected to the slot, performing the control such that the communication is performed between the first lane of the first memory and the first lane of the first controller, and the communication is performed between the second lane of the first memory and the second lane of the first controller, and in a case where the first memory is a dual port in the state where the edge is connected to the slot, performing the control such that the communication is performed between the first lane of the first memory and the first lane of the first controller, and the communication is performed between the second lane of the first memory and the first lane of the second controller, wherein the first lane of the first memory is configured to be directly connected to the first lane of the first controller, and the communication controller includes:

a first switch directly connected to the first memory via the second lane of the first memory, and configured to connect the second lane of the first memory to either the second lane of the first controller or the first lane of the second controller, and a micro controller directly connected to the first memory, and configured to set an operation mode of the first memory to a single port or a dual port, and control the first switch.

11. The method of claim 10, further comprising setting the operation mode of the first memory to the single port or the dual port by outputting a first signal to the first memory, and controlling the first switch by outputting a second signal to the first switch.

12. The method of claim 10, wherein the first and second controllers are provided in a single controller to which bifurcation that divides one link into two links is applicable.

13. The method of claim 10, further comprising controlling the communication between the first memory and the memory evaluating apparatus, based on a signal received from the memory evaluating apparatus.

14. The method of claim 10, wherein the first portion is configured to mount a second memory including first and second lanes thereto, the edge of the second portion is configured to connect to the slot of the memory evaluating apparatus that further includes a third controller including first and second lanes and a fourth controller including first and second lanes, and the communication controller is further configured to control communication between the second memory and the memory evaluating apparatus, the method further comprising:

in a case where the second memory is a single port in the state where the edge is connected to the slot, performing the control such that the communication is performed between the first lane of the second memory and the first lane of the third controller, and the communication is performed between the second lane of the second memory and the second lane of the third controller; and in a case where the second memory is a dual port in the state where the edge is connected to the slot, performing the control such that the communication is performed between the first lane of the second memory and the first lane of the third controller, and the communication is performed between the first lane of the second memory and the first lane of the fourth controller.

15. The method of claim 14, wherein the communication controller includes:

the first switch configured to connect the second lane of the first memory to either the second lane of the first controller or the first lane of the second controller; and a second switch configured to connect the second lane of the second memory to either the second lane of the third controller or the first lane of the fourth controller, the method further comprising setting an operation mode of the second memory to the single port or the dual port, and controlling the second switch.

16. The method of claim 15, further comprising setting the operation mode of the first memory to the single port or the dual port by outputting a first signal to the first memory, controlling the first switch by outputting a second signal to the first switch, setting the operation mode of the second memory to the single port or the dual port by outputting a third signal to the second memory, and controlling the second switch by outputting a fourth signal to the second switch.

17. The method of claim 14, wherein the first to fourth controllers are provided in a single controller to which bifurcation that divides one link into four links is applicable.

18. The method of claim 14, further comprising controlling the communication between the first and second memories and the memory evaluating apparatus, based on a signal received from the memory evaluating apparatus.

* * * * *